United States Patent [19]

Tysen et al.

[11] Patent Number: 5,497,422
[45] Date of Patent: Mar. 5, 1996

[54] MESSAGE PROTECTION MECHANISM AND GRAPHICAL USER INTERFACE THEREFOR

[75] Inventors: Atticus N. Tysen, San Francisco; Gursharan Sidhu, Menlo Park; C. Victor Chang, Fremont; Pablo Calamera, San Jose, all of Calif.

[73] Assignee: Apple Computer, Inc., Cupertino, Calif.

[21] Appl. No.: 129,941

[22] Filed: Sep. 30, 1993

[51] Int. Cl.$^6$ ............................................ H04L 9/00
[52] U.S. Cl. .............................................. 380/25
[58] Field of Search ................................. 380/25, 30

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,868,877 | 9/1989 | Fischer | 380/30 |
| 4,885,777 | 12/1989 | Takaragi et al. | 380/30 |
| 4,995,082 | 2/1991 | Schnorr | 380/30 |
| 5,005,200 | 4/1991 | Fischer | 380/30 |
| 5,164,988 | 11/1992 | Matyas et al. | 380/25 |
| 5,214,702 | 5/1993 | Fischer | 380/30 |
| 5,218,637 | 6/1993 | Angebaud et al. | 380/25 |
| 5,261,002 | 11/1993 | Perlman et al. | 380/30 |
| 5,299,263 | 3/1994 | Beller et al. | 380/30 |

OTHER PUBLICATIONS

"Terminal Equipment and Protocols for Telematic Services", Recommendation T.61, vol. VII, pp. 241–290, CCITT, IXth Plenary Assembly, Melbourne (1988).

"Data Communication Networks Directory", Blue Book, Recommendations X.500–X.521, vol. VIII, CCITT, IXth Plenary Assembly, Melbourne (1988).

"Public–Key Cryptography Standards", RSA Data Security, Inc. (1991).

Bidzos & Stammberger, "RSA Public Key Cryptosystem", RSA Data Security, Inc. (1990).

R. Rivest, "MD5 Message–Digest Algorithm", RFC #1321 (Apr. 1992), pp. 1–21.

Primary Examiner—Salvatore Canglialosi
Attorney, Agent, or Firm—Fliesler, Dubb, Meyer & Lovejoy

[57] ABSTRACT

A digitally signed message, protected with a chain of certificates from the sender's immediate certifier up through an ultimate certifier, is transmitted to a recipient together with the entire certificate chain. The entire certificate chain is stored in a single signer file accessible by the sender. Drag-and-drop gestures of a graphical user interface are used by the sender to sign and certify the message, and an icon is provided on the recipient's display to initiate verification.

26 Claims, 10 Drawing Sheets

MESSAGE PROTECTION MECHANISM AND GRAPHICAL USER INTERFACE THEREFOR

BACKGROUND

With the development of computer technology, the transfer of information in digital form has rapidly increased. In many instances it is necessary that the recipient of a message have a way of discovering whether the message actually came from a particular source, or whether the message was tampered with en route. Such authentication or verification of a message is necessary, for example, in banking applications where it is required that a signed document, such as a bank draft, be authenticated as being actually signed by the indicated signator.

A number of encryption and decryption techniques are readily available to provide some degree of authentication for digital communications. In one such technique, known as a "public key cryptosystem", each user (for example, user A) places in a public file a public key $E_A$ and maintains the secrecy of a corresponding private key $D_A$. $E_A$ is considered an enciphering, encryption, or encoding key, whereas the private key $D_A$ is considered a corresponding decryption, deciphering or decoding key. $E_A$ and $D_A$ satisfy the equation $$D_A(E_A(M))=M$$

for any message M. Furthermore, $D_A$ should not be readily computable from $E_A$. Whenever another user, for example, user B, wishes to send a message M to user A, user B obtains $E_A$ from the public file and encrypts the desired message M to form an encrypted message $E_A(M)$. User B then sends the encrypted message to user A, who decrypts the message by computing $D_A(E_A(M))=M$. Since $D_A$ is not derivable from $E_A$ in a practical way, only user A can decrypt the message $E_A(M)$ sent by user B. User A can send a response back to user B by encrypting the response message using user B's encryption key $E_B$, also available in the public file.

The above technique is useful where it is desired that only one recipient be able to read and understand the message. In an authentication mechanism, on the other hand, it is important only that no one but the particular sender can create the encrypted message. In this case, user B would encrypt the desired message using user B's own private key $D_B$ and the recipient user A would decrypt it using user B's public key $E_B$ obtained from the public file. Note that as used herein, because of the complementary nature between many public/ private key pairs, it will be understood that the term "encryption" and "decryption" indicate complementary activities merely with respect to each other. That is, as used herein, a message may be recovered from its "encrypted" form by "decrypting" it, and a message may also be recovered from its "decrypted" form by "encrypting it". The terms "encrypted" and "decrypted" are not intended to imply anything about the readability of an encrypted or decrypted message.

One well known public key cryptosystem is sponsored by RSA Data Security, Inc., Redwood City, Calif. According to the RSA technique, a digital signature is created by first passing the desired message through a known message digesting algorithm to form a digest for the message. A digest is an item of data which is derived from the message but is much shorter than the message itself. Since it is much shorter than the message itself, the same digest will be produced by many different possible messages in the overall message space. However, the message digesting algorithm is chosen so that if the message is altered in any way, it is extremely difficult to determine what further modification is required to the message in order to produce the same digest. Once the digest is created, it is encrypted according to the sender's private key. The sender then transfers the encrypted digest in conjunction with the sender's public key and the desired message to the recipient.

In order to verify the authenticity of the message, the recipient separately passes the message through the known message digest algorithm produce a verification digest. The recipient also decrypts the sender's encrypted digest using the sender's public key. In this manner, the recipient produces a decrypted digest which is then compared with the verification digest. If the two digests match, assuming the sender is the only entity who was able to use the sender's private key, the recipient has verified that the message did in fact originate from the sender and that it has not been altered in any way.

One possible way of subverting this technique is that an impostor might modify the message, create a new digest, encrypt it according to a different private key, and send the message on to the recipient with the new encrypted digest and with the public key corresponding to the impostor's private key. Assuming the recipient relies on the public key received with the message in order to verify the authenticity of the message, then the recipient's verification that the message originated from the original sender will be false.

The recipient can avoid this problem by obtaining the sender's public key from a separate source rather than relying on the public key received with the message. For example, if the sender and recipient have communicated before, the recipient may have the sender's public key from a prior communication. This can be problematical, however, especially if the recipient is to receive messages from more than one sender. In that case, the recipient must maintain a database of the public key associated with each possible sender. Such a database may be difficult to keep current if the recipient uses a stand-alone computer system.

Many larger organizations avoid this problem by maintaining a single database of the public keys associated with at least their own members, which may accessed over a network by their members. A corporation, for example, might maintain a network for its employees and maintain such a database on the network. In this manner, the recipient of a message can obtain the public key associated with the sender of the message from the central database, assuming the sender is a member of the organization. If either the sender of a message or the recipient of a message are not members of an organization which maintains such a database, or if the recipient in a particular instance does not have access to the database, then the recipient may be able to dial into a central database which is maintained for several different organizations to obtain the sender's public key.

This technique for verifying a sender's public key is typically useful only by recipients who are members of such larger organizations, or who pay a fee for modem access to a centralized database. A stand-alone user is usually excluded from this type of verification. In addition, even members of large organizations are excluded from this scheme if they are temporarily out of touch with their network, such as when they are using a portable computer on travel.

According to the RSA mechanism, a sender can prevent subversion of the authentication technique by transferring the original message and encrypted digest in conjunction with what is known as a certificate. To create the certificate, the sender passes the sender's public key through the message digesting algorithm to form a digest for the sender's public key, which is then encrypted by a third party certifier using the certifier's private key to form an encrypted digest of the sender's public key. The certifier may be any third party who is trusted by the recipient to not be subject to subversion by the impostor. The sender then transmits to the recipient the original desired message, the encrypted digest for the original message, and the certificate (including the sender's public key and the encrypted digest of the sender's public key). As with the non-certificated transmission, the sender may include the certifier's public key as part of the certificate. (Note that the sender does not actually need access to the certifier for each message; the certifier can encrypt the digest of the sender's public key once, and the sender can keep that encrypted digest locally for building all future certificates.)

In order to verify the authenticity of the message, the recipient uses the sender's public key, from the certificate, to verify the authenticity of the message itself in the manner described above. The recipient also uses the certifier's public key to verify the authenticity of the encrypted digest in the certificate of the sender's public key.

But the RSA certification scheme is also subject to subversion in the same manner as the non-certificated scheme if the recipient still must rely on the validity of the certifier's public key as provided in the certificate to determine the authenticity of the certificate itself. Both the uncertificated and the certificated transmission schemes sponsored by RSA, therefore, require that at some point, for maximum certainty of the authenticity of a received message, the recipient must know the public key of either the sender or of the certifier from a different source. As mentioned, however, that requirement tends to exclude many possible users.

In the RSA certification scheme, the most trusted third party is defined to be RSA Data Security, Inc. itself, or entities authorized by RSA Data Security, Inc. to use RSA's own private key (such as, possibly, employees or a key administering entity). Thus, whereas an ordinary sender of a message might use a first organization in which he is a member to certify his messages, that first organization might use a second organization to certify messages originated by the first organization. The second organization might then use RSA Data Security, Inc. itself to certify messages originated by the second organization. As long as the RSA private key remains secret, messages certified using the RSA private key are typically considered beyond subversion since the RSA public key is widely available from many sources. And since RSA is the nearest thing to a central certifier, an ordinary user-recipient of messages might download RSA;s public key once and keep it locally to verify any message which was certified using the RSA private key. The user need not rely on the RSA public key ostensibly transmitted with the message. However, this technique is also inadequate since most messages are not certified by RSA. Thus users are still undesirably excluded from the RSA cryptosystem.

The reasons set forth above which exclude recipients from the RSA cryptosystem, also tend to exclude senders of certificated messages if they use more than one certifier or if they frequently change public/private key pairs. If a sender uses more than one certifier for different messages, then the sender either needs to maintain a database of certificates, which could become outdated, or needs access to each certifier, which again usually requires membership in a large organization and connectability to the organization's network. If the sender frequently changes public/private key pairs, then the sender needs access to the certifier in order to have each new public key certified.

Separately, graphical user interfaces on computer systems are gaining widespread use. Typical systems include the Macintosh Finder™ environment in Macintosh computers provided by Apple Computer, Inc., Cupertino, Calif.; the Windows™ environment provided by Microsoft Corporation, Redmond, Wash.; and the New Wave™ environment provided by Hewlett-Packard, Palo Alto, Calif. In such systems, a workspace on the display system is set up with a desktop metaphor. Within the desktop, there are a number of icons displayed which correspond to objects stored in memory. The objects include, for instance, files, applications programs, control panels, and enclosures that enclose other objects. Opening an icon results in display of a window within the desktop corresponding to the underlying object. Thus, opening an application window, such as a word processor, results in display of a document into which text may be entered using the word processing program. Opening of a control panel icon results in opening of a control panel window by which the user controls system parameters. Opening of an enclosure icon, such as a folder in the Macintosh Finder™ environment, results in opening of a window that encloses other icons.

In the Macintosh Finder™ environment, each object includes a header specifying a four-byte object type and a four-byte creator. The file type field specifies, among other things, whether the object is a data file, an application program, a control panel, or an enclosure that encloses other objects.

The computer system is typically equipped with a pointing device such as a mouse and a pushbutton. When the user desires to select an object, the user first uses the mouse to position a cursor over the desired object, and then clicks the pushbutton once. The computer system changes the display of the icon corresponding to the selected object in some manner, such as by reverse video, to indicate that the object has been selected. To open an object, the user can first select the desired object and then select a control indicator entitled "open". Alternatively, the user can double-click on the desired icon. In either case, the computer system includes logic (including software) which determines the object type and creator, and performs the necessary steps to "open" the object. If the object type is "document", for example, and the creator is a word processor application program, then the computer system will invoke the application program and cause it to load in the selected document for editing. If the object type is "application program", then the computer system will invoke the application without any user-selected initial data.

Another behavior which a user can perform in the Macintosh Finder™ environment is known as "drag-and-drop". In this behavior, the user uses the pointing device to position the cursor over a first desired icon, presses the button, and before releasing it, uses the pointing device to "drag" the first icon to a second desired icon. The user then releases the pushbutton. In this manner, the user has selected two objects. If the first object is a data file and the second object is an enclosure which encloses other objects, such as a folder, the computer system will move the first selected object into the enclosure. If the second selected object is an application program, the computer system will invoke the application program and attempt to supply it with the first selected object as input or initial data. In this manner, a data file created using one application program may be easily brought into a second application program. For example, if the first selected object is a document created by a first word processor, and the second selected object is a second word processor application program, then the second word processor may attempt to convert the document from the format of the first word processor to the format of the second word processor before making it available for editing. The second word processor determines the creator of the input document from the creator field in the header of the input document.

Despite the ease with which a graphical user interface is used, and despite its familiarity to a large number of users, no easy way of signing documents, appending a certificate, or verifying documents, is known which takes advantage of the interface.

Accordingly, there is a strong need for improved techniques for signing and certifying documents and for verifying documents to ensure that they did in fact from the stated source, and that they have not been tampered with en route.

SUMMARY OF THE INVENTION

According to the invention, roughly described, a desired message is transferred from a source to a destination using a plurality of protection keys and verification keys, each particular one of the protection keys having a corresponding verification key which may be used to verify messages protected in accordance with the particular protection key. The method creates a protected message from the desired message in accordance with a first one of the protection keys, and transfers the protected message to the destination in conjunction with a chain of at least two certificates, the chain including a first certificate and there being a respective prior certificate in the chain for each certificate in the chain except the first certificate, each certificate in the chain including a respective verification key protected in accordance with a respective next one of the protection keys, the verification key in each given certificate in the chain except the first certificate corresponding to the protection key according to which the verification key in the prior certificate to the given certificate is protected, and the verification key in the first certificate corresponding to the first protection key.

Preferably the method is used with a display having a graphic workspace with icons displayed thereon, one of the icons representing a signer facility and another of the icons representing the desired message. In this situation the protected message is created in response to user input indicating selection of the signer facility icon in conjunction with the desired message icon.

In accordance with another aspect of the invention, a message transferred using a technique such as the above is verified by verifying the verification key in each certificate in the chain except the last certificate according to the verification key in the respective next certificate in the chain, verifying the verification key in the last certificate in the chain and verifying the protected message in accordance with the verification key in the first certificate.

Preferably also, where a display such as that described above is used, the display includes a 'signed' icon indicating that a corresponding object comprises the protected message. The above verification steps can then be performed in response to user input indicating selection of the 'signed' icon.

Yet another aspect of the invention, again roughly described, involves a data storage medium for use with a plurality of protection keys and verification keys, each particular one of the protection keys having a corresponding verification key which may be used to verify messages protected in accordance with the particular protection key. The data storage medium has stored thereon a protected message protected in accordance with a first one of the protection keys, and a chain of at least two certificates, the chain including a first certificate and a last certificate, there being a respective prior certificate in the chain for each certificate in the chain except the first certificate, each certificate in the chain including a respective protected verification key protected in accordance with a respective next one of the protection keys, the verification key in each given certificate in the chain except the first certificate corresponding to the protection key according to which the verification key in the prior certificate to the given certificate is protected, and the verification key in the first certificate corresponding to the first protection key.

Many other aspects of the invention will become apparent from a reading of the specification and claims set forth herein.

BRIEF DESCRIPTION OF THE DRAWINGS

The invention will be described with respect to particular embodiments thereof, and reference will be made to the drawings, in which like members are given like designations, and in which.

DETAILED DESCRIPTION

As used herein, the term "message" includes any item or items of information, whether or not encrypted, whether or not also included as part of a larger message, whether existing in a single file or more than one file, and whether or not divided into a plurality of packets. For example, a "message" might include an unaltered document with a digital signature appended thereon. In such a situation, the unaltered document itself might also constitute a "message", as might the digital signature. A certificate attached to a message might also itself constitute a "message" and be logically included in either of the above two messages and/or the overall message. No structure or content is implied by the term "message".

As used herein, a message is "protected" if some means is employed for a recipient to determine whether the message is authentic. As the term is used herein, message protection need not be absolute. For example, a document which is encrypted according to a sender's private key might be considered "protected according to such private key". A document which is not encrypted might be "protected according to a sender's private key" if, for example, a digest of the message is encrypted according to the sender's private key and transmitted with the unencrypted message. The message may be further "protected" if a certificate is attached.

As used herein, a digest "covers" a message if the message is at least part of the input data to the digesting algorithm. Even if the digesting algorithm digests a larger message which includes a desired sub-message, as used herein the resulting digest is still considered to "cover" the desired sub-message.

I. SYSTEM OVERVIEW

Figure 1:
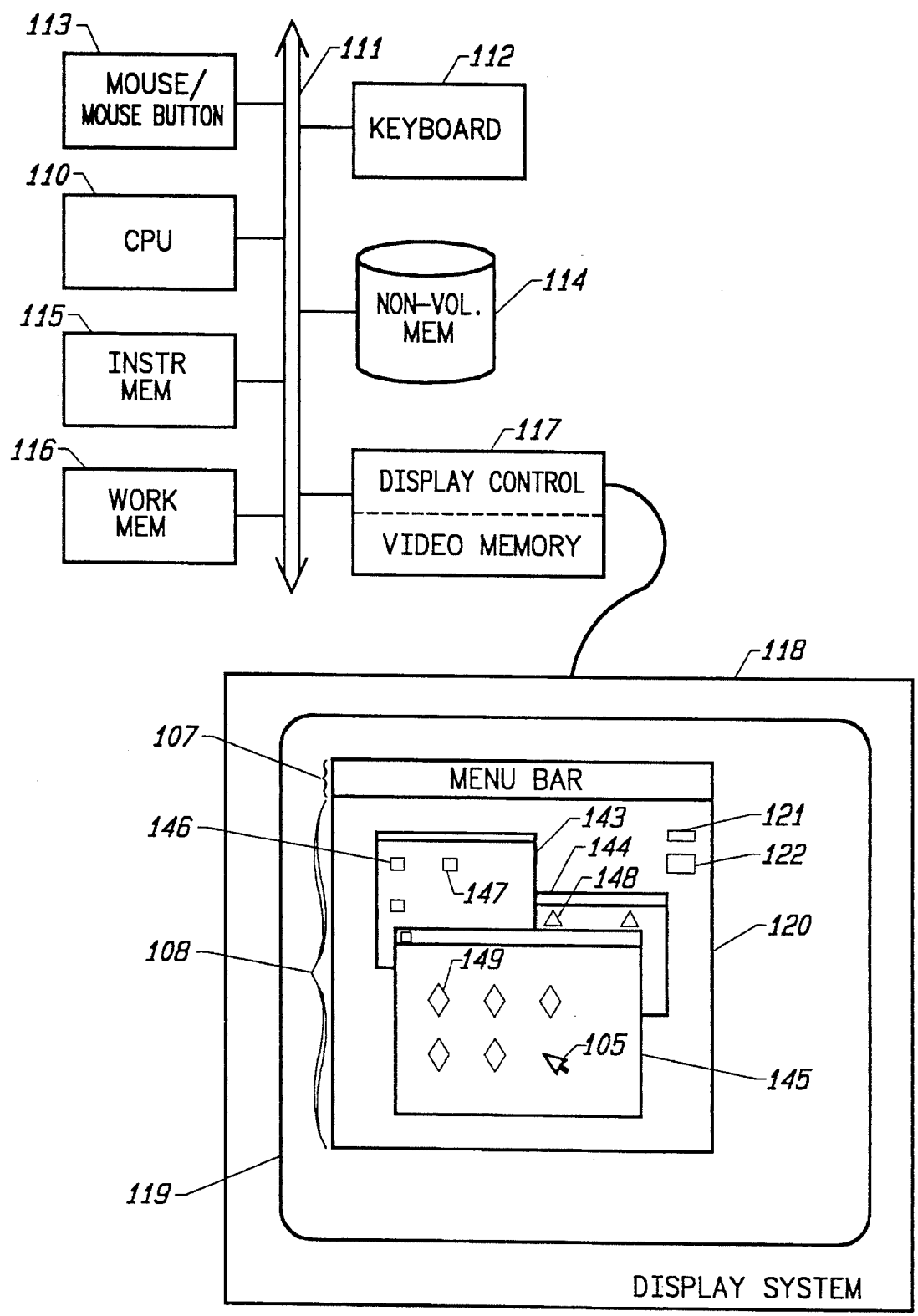
FIG. 1 illustrates a computer system which can be used to implement features of the present invention.

FIG. 1 illustrates a computer system implementing the features of the present invention. The computer system includes a host CPU 110 coupled to a system bus 111. The system includes a keyboard 112, a mouse 113 including a mouse button, or other pointing device, and a non-volatile memory 114, such as a hard disk, floppy disk, non-volatile integrated circuit memory system, or the like. Similarly, instruction memory 115 and working memory 116 are coupled to the bus 111. The instruction memory 115 stores window management software, among other software needed for operation of the system. The working memory 116 is used to maintain various tables needed by the software in the instruction memory 115 in order to maintain the display.

The system also includes a display controller 117 which includes video memory. The display controller 117 drives a display 118 such as a CRT video monitor, LCD flat panel display, or the like. The display system 118 has a screen, generally 119. On the screen 119, a workspace 120 is displayed. The workspace 120 is implemented with a desktop metaphor in the Macintosh type systems with a menu bar region 107 for pop-down menus, and a window region 108 for displaying windows and icons. Within the window region 108 of the desktop 120, a plurality of identifiers may be displayed, such as the identifier 121 representing a hard disk drive, the identifier 122 representing a floppy disk, and other identifiers not shown which represent files, applications, control panels, or enclosures which enclose other objects. Also in the window region of the desktop 120, a plurality of windows, such as windows 143, 144, and 145 may be opened. The windows 143, 144, and 145 enclose identifiers, such as identifiers 146 and 147 in window 143, identifier 148 in window 144, and identifier 149 in window 145.

Windows may overlap other windows, so identifiers in one window can become obscured by another window. But the entire surface of the identifier is "hot" during a drag, so the user only needs leave one pixel showing an identifier for the entire identifier to be accessible.

In the figure, the identifiers are shown as graphical elements, or icons. Alternative identifiers may be textual elements, such as the name of the corresponding object. The behaviors described herein may be applied to both textual and graphical elements, as may occur in windows opened in a view by name mode or a view by icon mode in Macintosh computers.

Displayed within the desktop 120 is the cursor 105. In order to identify a particular desired icon, the user moves the cursor on the display by moving the mouse 113 in a corresponding motion. When the cursor is positioned over one of the icons, the icon automatically changes to reverse video. The user can click on that icon using the mouse button, and can drag it to another icon, either in the same window or in a different window, and then release the mouse button to indicate selection of objects corresponding to both the first and second icons.

Figure 2:
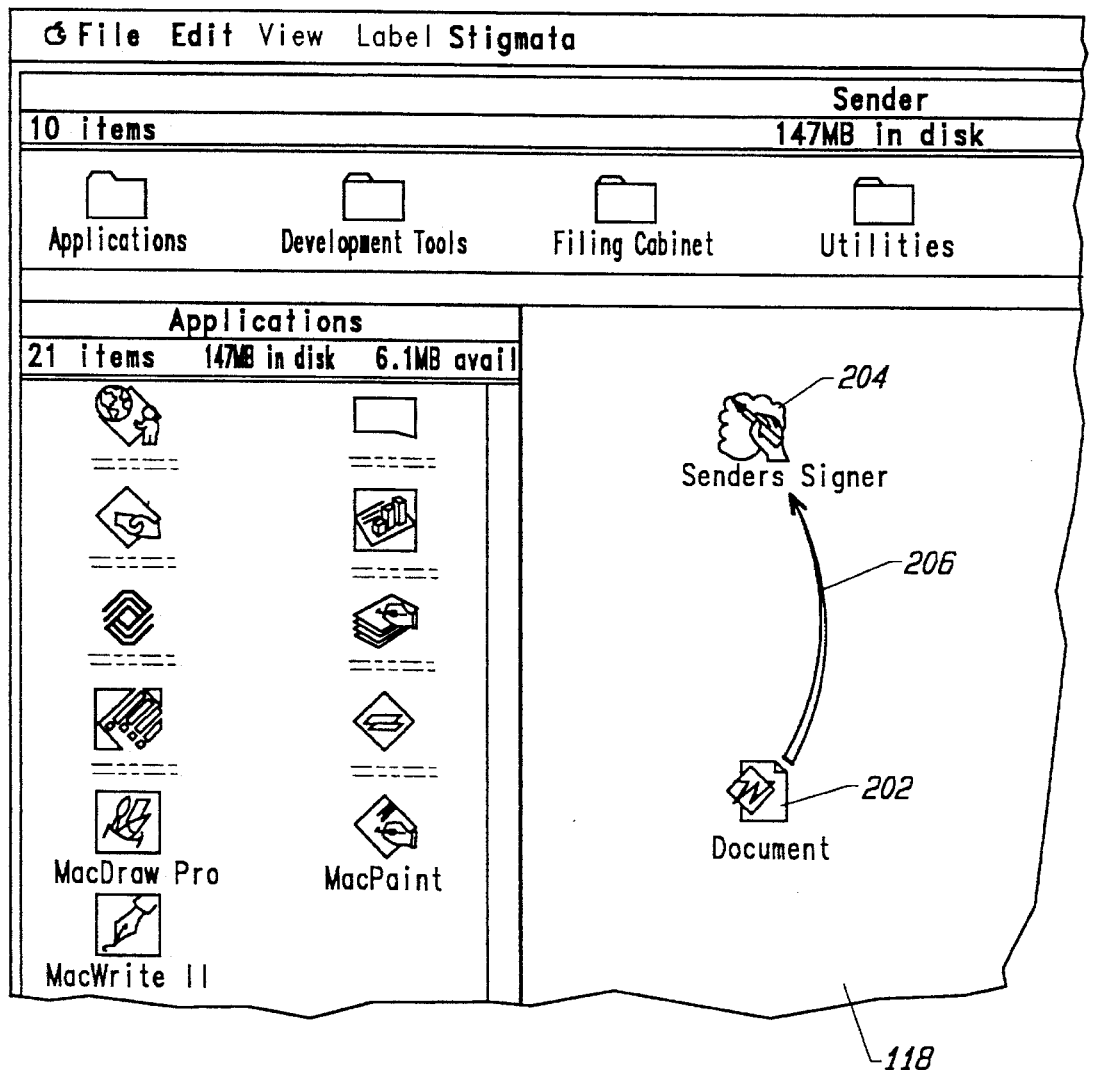
FIG. 2 illustrates a portion of a display which might be produced by the system of FIG. 1.

FIG. 2 is an illustration of a portion of a display which might be produced on display system 118. It is a standard Macintosh display with two icons appearing in the window area 118. The first icon is a document 202, which might have been created by the MacWrite II word processor, and a "sender's signer" icon 204. The object represented by the sender's signer icon 204 is a signer file which is described in more detail below. Briefly, however, the sender's file may be located, for example, in non-volatile memory 114, and includes a "certificate database". The certificate database includes a complete chain of certificates from the sender up through some ultimate certifier, preferably RSA Data Security, Inc. Each certificate in the chain includes a public key and an encryptic digest covering the public key. In the first certificate, the public key is the key corresponding to the private key according to which the user may protect a desired message. The encryptic digest of that public key in the first certificate is encrypted using the private key of a first certifier (also called a first certificate issuer).

The public key in the second certificate is that of the first certifier, that is, the public key corresponding to the private key according to which the digest in the first certificate was encrypted. The encrypted digest in the second certificate is encrypted according the private key of a second certifier.

The third certificate includes the public key of the second certifier, that is, the public key corresponding to private key according to which the digest in the second certificate was encrypted. The third certificate also includes an encrypted digest covering the third public key, encrypted according to the private key of yet a fourth certifier and so on to the ultimate certifier. Since the integrity of the ultimate certifier is assumed to be beyond question, the ultimate certifier's public key may be appended to the end of the chain as a courtesy. As used herein, the term "certificate" includes one public key and an encrypted digest covering that public key. This is merely a convenient term for grouping such information together logically, and it will be understood that the physical structure of a given certificate chain need not necessarily correspond exactly to such logical groupings.

According to an aspect of the invention, at least two certificates are included in the chain, a first certificate and a last certificate.

Note that the certificate database in the sender's signer file exists before the sender's signer file is opened for certifying a new message. The user does not need to have access to the private key of any of the certifiers in order to create certificates on the fly. Rather, the certificate database preferably was previously created by the user providing user's public key, together with the user's certificate, to the first certifier, who signed the user's certificate using the first certifier's private key. The first certifier preferably packaged the signed user's certificate together with further certificates, and returned them to the user in the form of a signer file. The first certifier preferably previously obtained such further certificates by providing the first certifier's public key, together with the first certifier's own certificate, to the second certifier who signed it using the second certifier's private key. The second certifier preferably returned the first certifier's signed certificate to the first certifier, together with still further certificates. Preferably, this process started with the ultimate certifier and continued down to the first certifier, such that by the time the user provides the user's certificate to the first certifier for signing, the further certificates returned by the first certifier to the user already include the complete chain of certificates up to the ultimate certifier. Note that the private keys never need to be accessed by anyone other than the owner of each private key.

Preferably, the signer file 204 also includes the user's name, the user's public key, and a password-encrypted version of the user's private key. The encryption of the user's private key in the signer file need not be as secure as the full RSA scheme, since the signer file is entirely under the user's control. For example, the user can keep the signer file only a floppy disk, and never allow anyone else access to the floppy disk. Encryption of the user's private key may be, for example, by the well-known DES algorithm.

To sign a document such as that represented by icon 202 (FIG. 2), the user clicks on the document icon 202 and drags it to the sender's signer icon 204 as indicated by arrow 206. Alternatively, the user can select the document and then click on a menu command to "sign" it. In either case, signer logic (including software representing a signer routine running in instruction memory 115) then performs the signing operation. The signing operation involves first digesting the input document 202 by a message digesting algorithm, such as the well known MD5 algorithm, encrypting the digest using the user's private key (obtained and decrypted from the signer file), and appending both the encrypted digest and the entire certificate database, also obtained from the signer file, as a trailer on the document 202. The resulting protected message is returned to the object represented by icon 202. The software also "locks" the object 202 at this time since it is assumed that once protected, the user is unlikely to want to modify it.

In order to transmit the message to a destination, any standard medium may be used. For example, the protected document 202 may be copied to a floppy disk in the usual manner and physically delivered to the recipient. As another example, the protected document may be transmitted via a network and/or telephone lines to the recipient.

Figure 3:
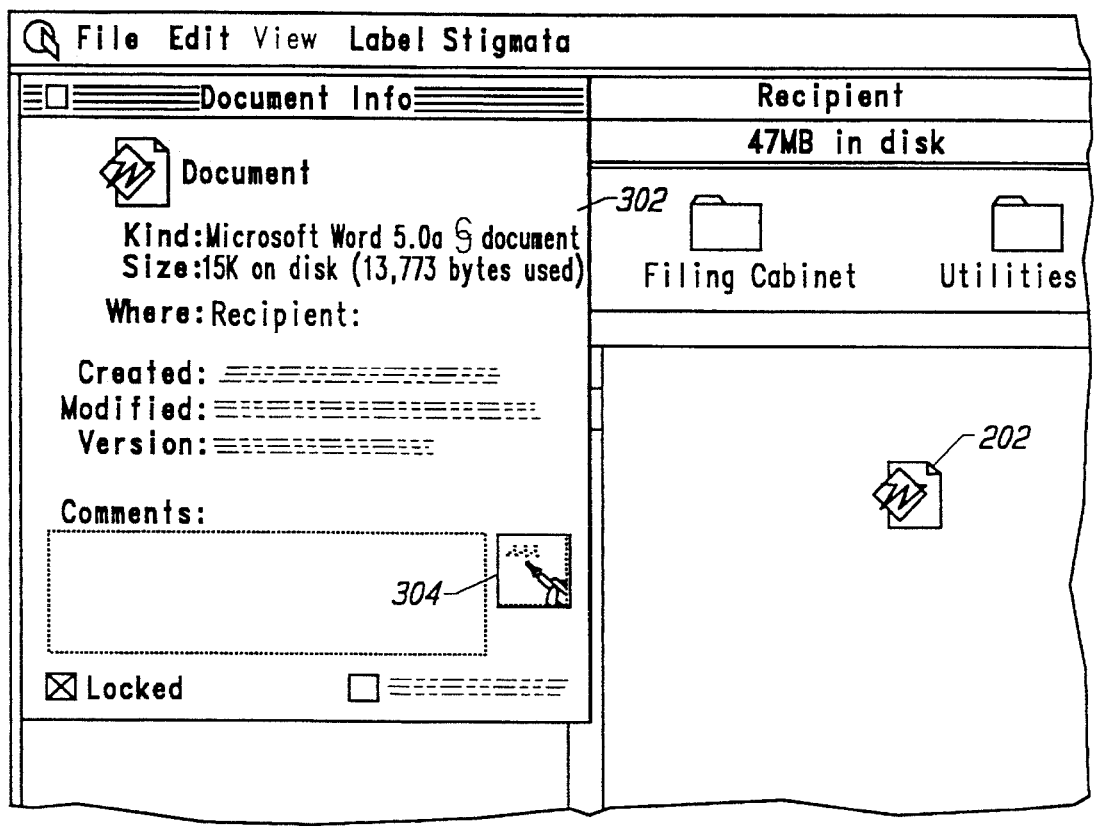
FIG. 3 illustrates a portion of a desktop produced by a computer system.

On the recipient's computer, in a portion of the desktop of which is illustrated in FIG. 3, the received document appears as an icon in the usual manner. If the recipient selects this icon and opens the "get info" window, in a conventional manner, the get info window 302 appears. Included in the get info window is an icon 304 which indicates that the document has been signed.

The recipient may check the authenticity of the received message 202 merely by clicking on the icon 304 in the get info box 302. Verification logic in the computer system (including software running a verification routine) verifies the authenticity of the basic message by first passing it through the MD5 message digesting algorithm to produce a "verification digest", and then by decrypting the signer's digest appended to the message 202 using the sender's public key, from the first certificate in the certificate database appended to the message 202. The verification routine also verifies the authenticity of the public key in the first certificate using the digest in the first certificate and the public key contained within the second certificate, and so on through the certificate chain in the certificate database received with the protected message 202. Only if all of the verification digests created in this process match the corresponding digests decrypted from the protected message 202, does the verification logic indicate authenticity.

Figure 4:
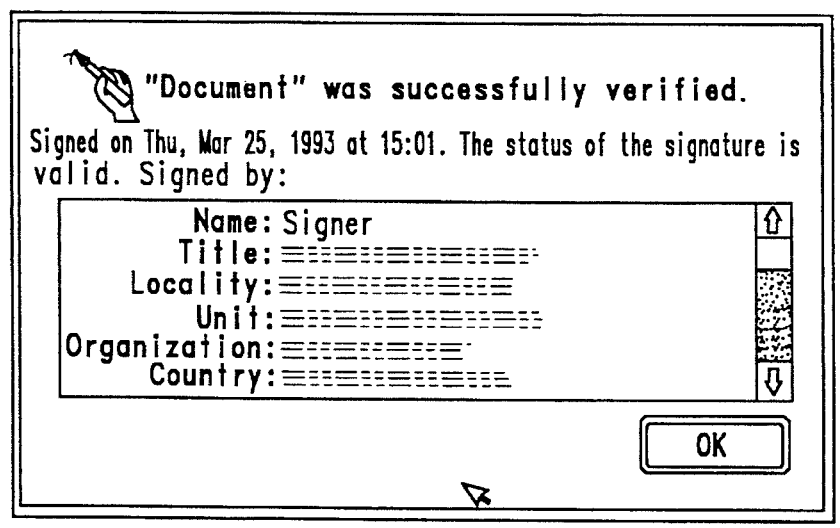
FIG. 4 illustrates a dialogue box produced by a computer system.
Figure 5:
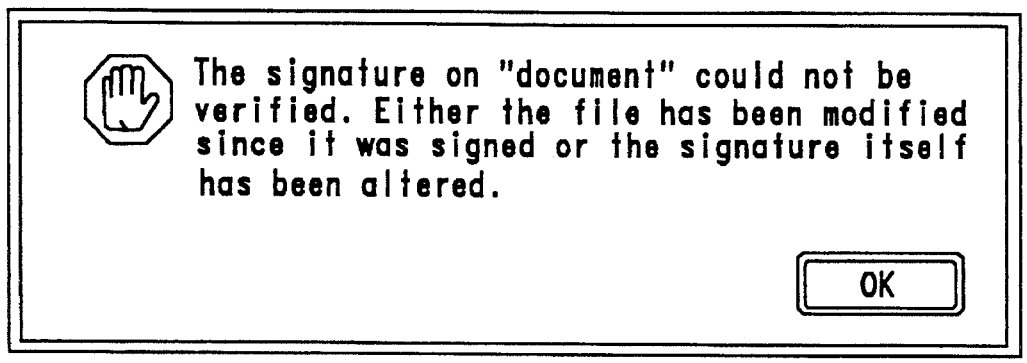
FIG. 5 illustrates another dialogue box produced by a computer system.

FIG. 4 illustrates a dialogue box which the verification logic presents on the recipient's display screen to indicate that the document was successfully verified. In this illustration, the dialogue box indicates the date and the time at which the document was signed, and the name and various other identification information about the signer. This information can be displayed if, for example, it is included in the first certificate in the certificate database received with the message. If any one of the verification digests formed by the verification routine fails to match the corresponding digest decrypted from the message, the verification routine so indicates with a dialogue box such as that shown in FIG. 5.

II. INTERFACE MANAGEMENT LOGIC IMPLEMENTATION

Figure 6:
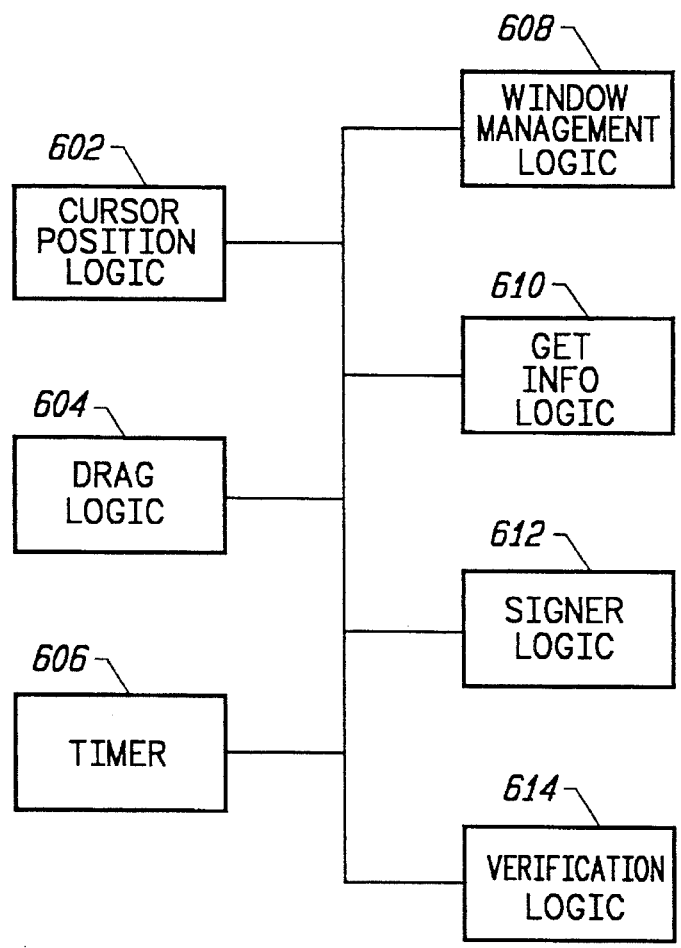
FIG. 6 illustrates symbolically the architecture of software which may be used for implementing the invention.

As mentioned above, a computer system implementing the present invention includes a control software. FIG. 6 illustrates symbolically the architecture for relevant aspects of such software.

As shown in FIG. 6, the system includes cursor position logic 602 which maintains information concerning the current position of the cursor within the desktop area on the display. Also, drag logic 604 monitors the mouse actions including the mouse button and movement of the mouse to indicate the execution of a drag operation. Obviously with pointing devices other than a mouse, a drag operation may be indicated by a variety of other user actions.

The system also includes timer logic 606 for detecting a pause of the cursor over a particular identifier in the interface management routine. Also, the timer 606 may be used for other purposes.

The system further includes window management logic 608 which performs a variety of functions known to those of skill in the art for managing windows. This window management logic includes a system for opening and closing windows on the desktop in response to pointer actions, and maintains a desktop Window List. The desktop Window List comprises a list of windows that are opened on the desktop, their positions on the desktop, and other characteristics of the window, the location, the types of windows, and information about icons, if any, enclosed by the window. Further, enclosure windows in the list point to a window record that contains information about the enclosures that are represented by identifiers in the windows, and such other information as is needed. In cooperation with the drag logic 604, the window management logic 608 also maintains a record referred to as the Current Enclosure which indicates the identifier that the cursor is presently positioned over.

The system illustrated symbolically in FIG. 6 also includes get info logic 610, which when activated opens a dialogue box on the display to provide information about any object that is currently selected by the user. As mentioned above, if the object is a document which has been signed, the get info logic 610 displays an icon to that effect in the dialogue box.

The system further includes signer logic 612, which is invoked by the Macintosh Finder™ when the drag logic 604 detects that the user has clicked and dragged a document over to an icon representing a file which has "signer file" as its document type. Signer logic 612 is described in more detail below.

The system further includes verification logic 614, which is invoked when the drag logic 604 detects the user has clicked on the control icon in the get info box which indicates that the document has been signed. The verification logic 614 is described in more detail below as well.

III. SIGNER FILE FORMAT

The signer file represented by icon 204 (FIG. 2) is a standard Macintosh file stored on a storage medium. The signer file, illustrated symbolically in FIG. 7 as 702, comprises a header 704, a data fork 706, and a resource fork 708. The header 704 contains the standard file header information, including a field 710 which specifies the file "type" as a "signer file". The data fork 706 contains the certificate database, described in more detail below. The resource fork 708 contains three resources: the owner's name, the owner's public key and the owner's private key. The owner's name, in field 712, is optional; it is not required for the use of the public/private key file. Including this information in the same file as the private key and the certificate database, however, does add convenience of use. The same is true for the user's public key in field 714.

The owner's name is the entire distinguished name. Distinguished names are defined in CCITT, "Data Communication Networks Directory," Recommendations X.501 and X.520. CCITT recommendations X.500–X.521 are all published in the CCITT "Blue Book", Vol. VIII, entitled "Data Communication Networks Directory, Recommendations X.500–X.521" (1989), incorporated herein in its entirety. Basically a distinguished name is a well-known structure which uniquely identifies an entity in a hierarchical name space. It is stored in the resource 712 as a DER-encoded stream.

The public key resource 714 of the resource fork 708 contains the owner's public key, from a public/private key pair which was issued to the owner by an issuing authority. The public and private key pair conform to the standards for RSA encoding, set forth in Rivest, et al., U.S. Pat. No. 4,405,829, incorporated herein by reference. The public key is stored in resource 714 as a string of bytes.

The private key resource 716 contains the private key of the public/private key assigned to the owner of the signer file 702. It is encrypted according to the well-known DES algorithm and stored in resource 716 as a string of bytes. The DES encryption standard is described in National Institutes of Standards and Technology, "Data Encryption Standard", FIPS Publication No. 46-1 (January 1988), incorporated herein by reference.

Figure 7:
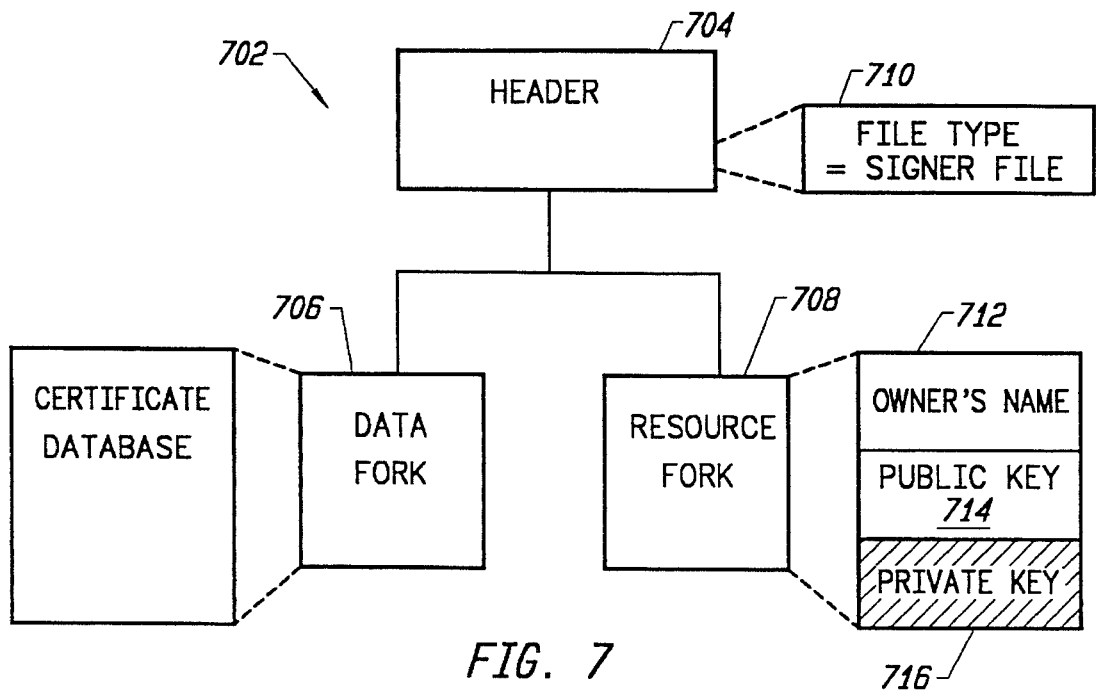
FIG. 7 illustrates symbolically the structure of a signer file.
Figure 8:
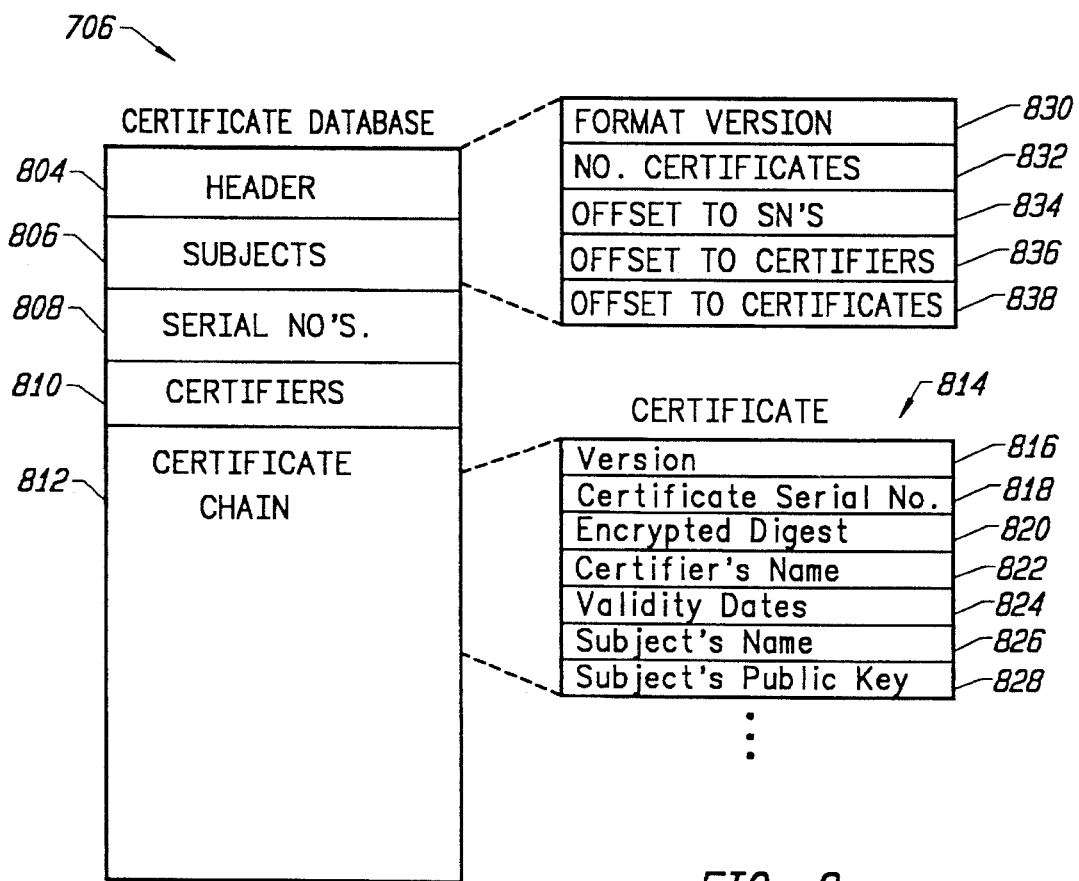
FIG. 8 shows symbolically the format of a certificate database in a signer file.

FIG. 8 shows symbolically the format of the certificate database in the data fork 706 of the signer file 702 (FIG. 7). It comprises a Header Section 804, followed by a Subjects Section, a Serial Numbers Section and an Certifiers Section 806, 808 and 810 respectively. The Certifiers Section 810 is followed by a certificate chain 812. The certificate chain 812 consists of all the certificates from the owner of the signer file up through RSA Data Security, Inc. Each certificate is represented as a continuous stream of bytes, and follows the format set forth in CCITT recommendation X.509. Specifically, each certificate includes a unique serial number of the certificate and identifier of the algorithm used to sign the certificate (which in the case of the present embodiment is MD5), the distinguished name of the certification authority which produced the certificate, the distinguished name of the user whose public key is certified by the certificate, the public key itself which has been encrypted according to the certifier's own private key, and an indication of the first and last date on which the certificate is valid.

The data type of a certificate conforms to the following format set forth in ASN.1 nomenclature. ASN.1 nomenclature is described in Kaliski, Jr., RSA Data Security, Inc., "A Layman's Guide to the Subset of ASN.1, BER and DER", published in RSA Data Security, Inc., "Public-Key Cryptography Standards (PKCS)" (1991), incorporated herein in its entirety.

```
Certificate : :=              SIGNED SEQUENCE{
   version                       [0]Version DEFAULT 1988,
   serialNumber                  SerialNumber,
   signature                     AlgorithmIdentifier,
   certifier                     Name
   validity                      Validity,
   subject                       Name,
   subjectPublicKeyInfo          SubjectPublicKeyInfo}
Version : :=                  INTEGER {1988 (0) }
SerialNumber : :=             INTEGER
Validity : :=                 SEQUENCE{
   notBefore                     UTCTime,
   notAfter                      UTCTime}
SubjectPublicKeyInfo : :=     SEQUENCE{
   algorithm                     AlgorithmIdentifier
   subjectKey                    BIT STRING}
AlgorithmIdentifier : :=      SEQUENCE{
   algorithm                     OBJECT IDENTIFIER
   parameters                    ANY DEFINED BY algorithm
OPTIONAL}
```

More specifically, the certificate has the following data type:

```
Content Info SEQUENCE {
  contentType OBJECT IDENTIFIER
  content [0]
    Signed Data SEQUENCE {
      version INTEGER
      digestAlgorithms SET OF {
        digestAlgorithmIdentifier SEQUENCE {
          algorithm OBJECT IDENTIFIER
          parameter NULL }}
      contentInfo SEQUENCE {
        contentType OBJECT IDENTIFIER }
      certificates SET OF {
        certificate
      }
      signerInfos SET OF {
        signerInfo SEQUENCE {
          version INTEGER
          issuerAndSerialNumber SEQUENCE {
            issuerName
            serialNumber }
          digestAlgorithm SEQUENCE {
            algorithm OBJECT IDENTIFIER
            parameter NULL }
          authenticatedAttributes SEQUENCE {
            attribute SEQUENCE {
              type OBJECT IDENTIFIER
              values SET {
                content type OBJECT IDENTIFIER }}
            attribute SEQUENCE {
              type OBJECT IDENTIFIER
              values SET {
                message digest OCTET STRING }}
            attribute SEQUENCE {
              type OBJECT IDENTIFIER
              values SET {
                signing time UTC TIME }}}
          digestEncryptionAlgorithm SEQUENCE {
            algorithm OBJECT IDENTIFIER
            parameter NULL }
          encryptedDigest OCTET STRING }}}}
```

The contents of several of the more pertinent fields of an individual certificate 814 are set forth more symbolically in FIG. 8. The certificate also includes additional information which is not important for an understanding of the invention.

The individual certificates in the certificate chain 812 are set forth sequentially, starting with the certificate which protects the signer file owner's public key, followed by the certificate which protects the first certifier's public key, followed by the certificate which protects the second certifier's public key, and so on all the way through an ultimate certifier which in the present embodiment is RSA Data Security, Inc.

As previously mentioned, in addition to the certificate chain 812, the certificate database 706 also includes a Header Section 804, a Subjects Section 806, a Serial Numbers Section 808 and an Certifier's Section 810. The Subjects Section 806 contains a list of the names of all of the subjects whose public keys are protected in the certificate database 812. These names are extracted from the certificates and provided additionally as a list in order to facilitate searching for certificates by subject name. Similarly, the Serial Numbers Section 808 is a list of all of the certificate serial numbers in the certificate chain 812, duplicated here in order to facilitate searching by certificate serial number. Similarly, the Certifiers Section 810 is a list of all of the certifier names from the different certificates in the certificate chain 812, duplicated as a list to facilitate searching for certificates by certifier name.

The Header Section 804 in the certificate database 706 merely includes a database file format version number in a field 830, a field 832 specifying the number of certificates in the certificate chain 812, a field 834 containing an offset to the beginning of Serial Numbers Section 808, a field 836 containing an offset to the Certifiers Section 810, and a field 838 containing an offset to the beginning of the certificate chain 812. No field is required to contain an offset to the Subjects Section 806 since that section begins immediately following the Header Section 804. Set forth below is a set of C language typedefs which define the structure of certificate database 706.

```
typedef struct {
    short       version;
    short       numberOfCerts;
    long        offsetToSerialNumbers;
    long        offsetToIssuers;
    long        offsetToCertificates;
} CertDBHeader,    *CertDBHeaderPtr;
typedef struct {
    Ptr             data;
    unsigned int    len;
} DataElement;
typedef struct CertificateStruct {
    DataElement         subjectName;
    DataElement         serialNumber;
    DataElement         issuerName;
    DataElement         certificate;
    struct CertificateStruct * nextCert;
} CertificateSetRec, *CertificateSetPtr;
```

IV. CREATING A SIGNER FILE

Figure 9:
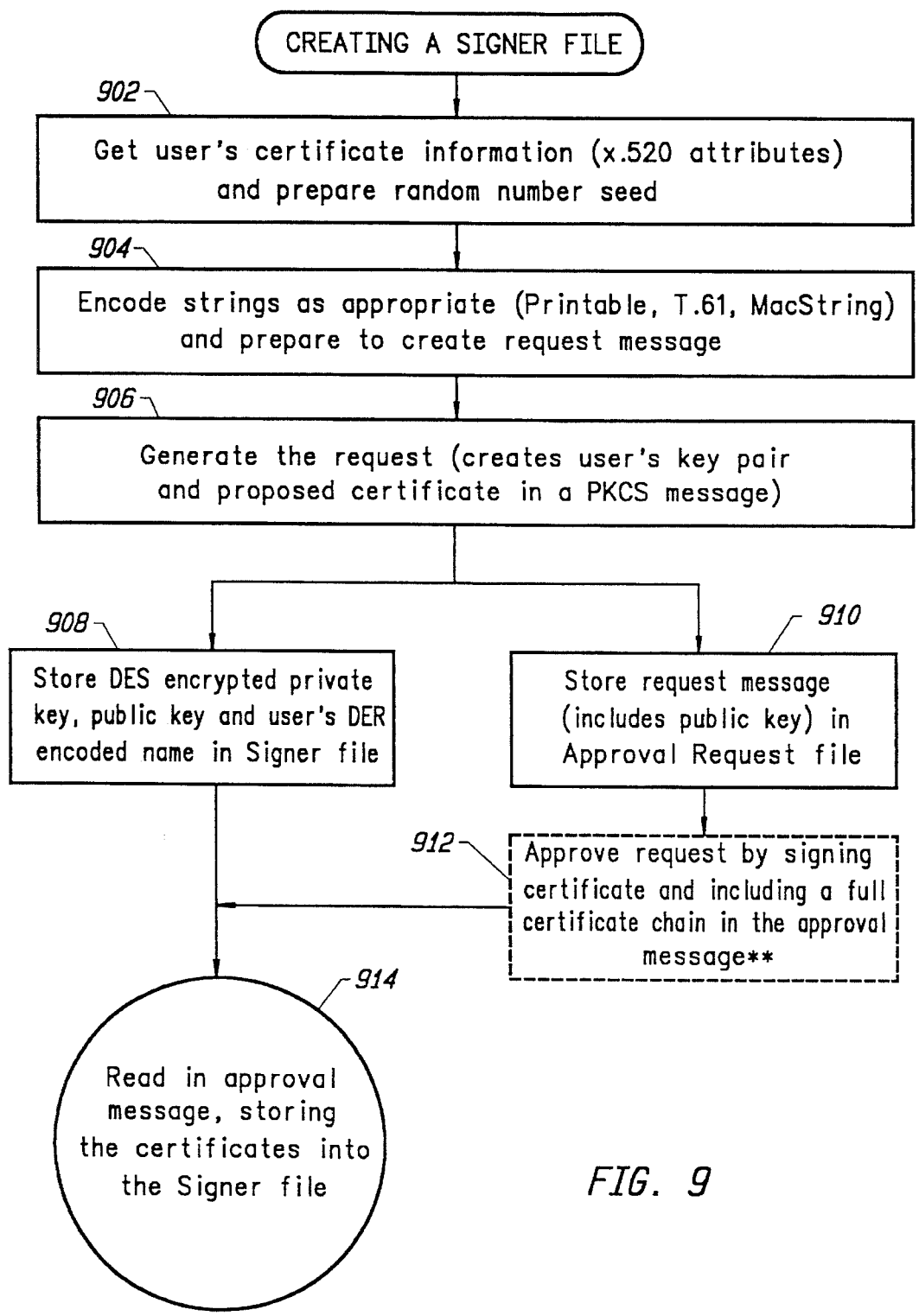
FIG. 9 is a flowchart illustrating steps which are performed to create a signer file.

There are many ways to have a signer file created. Preferably, however, it is created by a "Digisign" utility in the following manner. First, the user activates the Digisign utility in the usual manner, such as by double clicking on an icon representing that program. The user then selects a menu choice offered by the utility, to prepare a new "request" message. FIG. 9 is a flow chart illustrating the steps which are then performed. These steps will be discussed only generally, since the specifics of their implementation do not relate to the invention. In a step 902, the Digisign utility obtains all the information necessary to generate a request message. This includes preparing a random number seed which will be used to generate a public/private key pair, and obtaining the user's name. The user's name and other name attributes can be obtained via a dialogue box on the display 118 (FIG. 1).

In a step 904, the information is encoded as appropriate. In a step 906, the information is used to generate the request message itself, as well as other information which may be placed in the signer file immediately. Step 906 includes the step of creating the user's public/private key pair in a well-known manner, using the random number seed prepared in step 902.

In step 908, the program DES-encrypts the user's private key and stores it in the signer file on the storage medium. The program also DER-encodes the user's name and stores it in the signer file as well. DER-encoding is well known and is described in CCITT Recommendation X.509. The user's public key is also placed in the signer file in step 908.

In step 910, the Digisign utility prepares a proposed certificate to be approved (signed) by the user's certifying authority. The proposed certificate includes the user's name and the user's public key, all other fields of the certificate remaining blank. (See certificate 814 in FIG. 8.) The proposed certificate is stored in an approval request file in step 910, and transmitted to the certifying authority either via a network or by some other delivery method.

Step 912 is shown dotted in FIG. 9 because it is performed by the certifying authority rather than by the signer manager program on the user's computer. Part of step 912 may be performed, for example, by certificate issuing software available from RSA Data Security, Inc. In step 912, the certifying authority creates a digest of the user's public key, encrypts it using the certifying authority's own private key, and places it in field 820 of the proposed certificate (FIG. 8). The certifying authority also at this time adds the version number to field 816, the unique certificate serial number in field 818, the certifier's own name in field 822, and validity dates for the certificate in field 824. Preferably the certifying authority has a signer file similar to that shown in FIG. 7, and obtains its own distinguished name and private key from that file. The certifying authority then attaches its own certificate chain 812 to the end of the proposed certificate provided by the user (such a user, to the certifying authority, is considered a "subject"). Again, the certifying authority preferably obtains its own certificate chain from a signer file such as that shown in FIG. 7. The resulting file created by the certifying authority is referred to as an approval message, which is then returned to the user.

In step 914, the Digisign utility reads in the approval message and stores the entire certificate chain in the user's signer file. The Digisign utility also at this time creates the Header Section 804, the Subjects Section 806, the Serial Numbers Section 808 and the Certifiers Section 810 for the certificate database 706 in the signer file. Note that since steps 908 and 914 are usually separated in time, the Digisign utility may require the user to activate step 914 manually after the approval message is received. This may be accomplished by having the user select and "incorporate approval" menu choice in the Digisign utility.

As previously mentioned, part of step 912 involves the attachment by the certifying authority of its own certificate chain to the certificate proposed by the user. As mentioned, that certificate chain is preferably obtained from the certifying authority's own signer file. Furthermore, preferably, the certifying authority created its own signer file in the same manner as set forth in FIG. 9. Similarly, the certifying authority which attaches its own certificate chain to that proposed by the user's certifying authority's proposed certificate also preferably created its signer file in the manner set forth in FIG. 9, and so on. It can be seen that once the user creates the signer file, the user need never again have access to the certifying authority in order to sign a document as long as all of the certificates in the chain remain valid.

V. SIGNER LOGIC

A. Activating the Signer Logic

After a signer file is created, the user can "sign" a document or other message by activating the signer logic 612 (FIG. 6) in any of a number of ways. First, the user can activate the signer logic 612 by clicking on a "do signing" menu choice in the Digisign utility. Alternatively, the user can select an icon on the desktop 118 (FIG. 2) representing the desired message, and can then click on a "do signing" option in a Macintosh menu (such as the EDIT menu). Preferably, however, the user merely clicks on the icon representing the desired message and drags it via the pointing device to the user's signer file as shown in FIG. 2.

Figure 10:
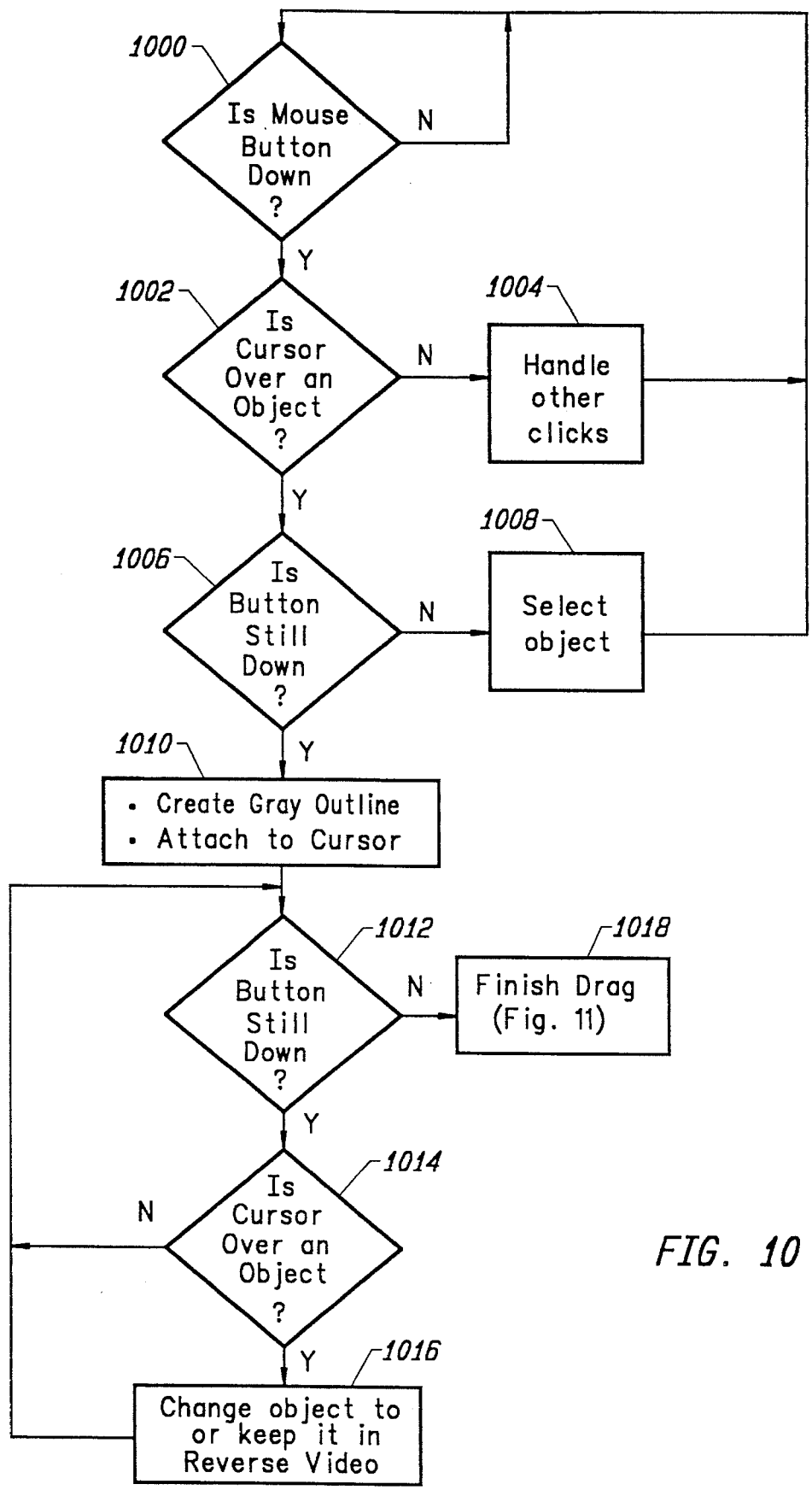
FIGS. 10–11 in combination form a functional flowchart illustrating how the system of FIG. 6 responds to a drag-and-drop operation.
Figure 11:
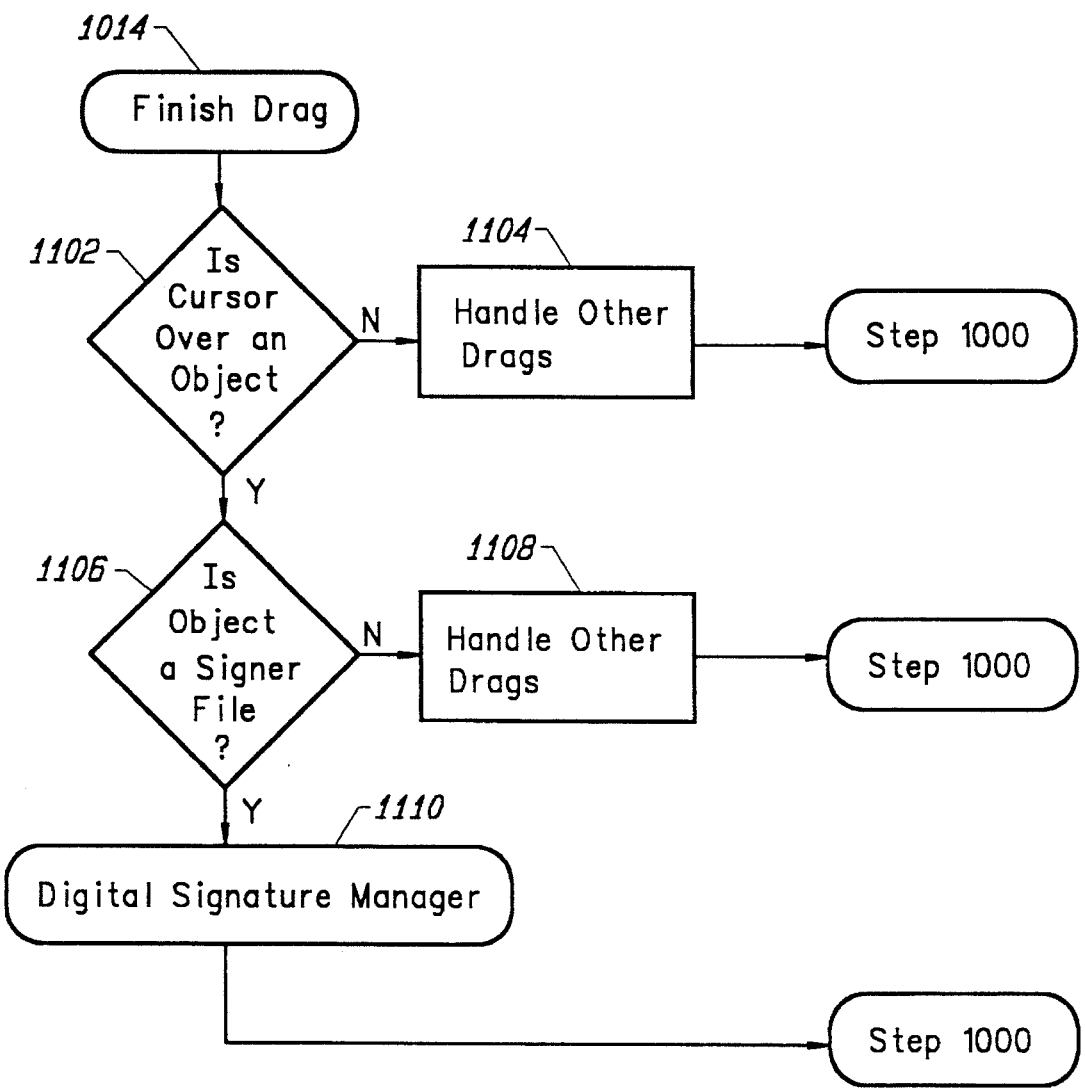

FIGS. 10–11 contain a functional flow chart illustrating in a simplified manner how the system of FIG. 6 responds to such a drag-and-drop operation. FIG. 10 illustrates the main loop. The main loop begins at a decision step 1000 which monitors the mouse button. If the mouse button is not down, the algorithm loops at block 1000. If the mouse button is down, then the algorithm tests to determine whether the cursor is over an object (1002). If it is not over an object, then the algorithm handles other clicks and cursor operations (block 1004) and loops back to block 1000. If the cursor is over an object at block 1002, then the algorithm monitors the mouse button (block 1006). If the mouse button does not remain down, then a Select Object routine is executed as indicated in block 1008, and the algorithm loops back to block 1000. The Select Object routine 1008 may result in a variety of operations known in the art, such as opening an application window or enabling certain menu options.

If the mouse button remains down at block 1006, then a drag operation is indicated. In this case, the routine creates a gray outline (referred to as an "altered view") of the object and attaches the gray outline to the cursor.

In step 1012, the system determines whether the mouse button is still down. If it is still down, then it determines whether the cursor is now over an object (step 1014). If the cursor is not over all object, then the system loops back to step 1012 to determine whether the button remains down. If the cursor is over an object (step 1014), then the system changes the object in the window to a reverse video appearance (1016). (If the object has already been given a reverse video appearance by this step 1016 (i.e. the cursor is still over the object, then step 1016 merely maintains that status.) After step 1016, the system again loops back to step 1012. If step 1012 detects that the mouse button has been released, then control passes to a Finish Drag routine 1018, shown in more functional detail in FIG. 11.

Referring to FIG. 11, when the mouse button is released, decision step 1102 determines whether the cursor is over an object. If it is not, then control passes to a step 1104 which handles the type of drag behavior indicated by the user and thereafter returns to step 1000 (FIG. 10). The details of step 1104 are not important for an understanding of the present invention.

If the cursor is over an object in step 1102, then a decision step 1106 checks the file type field of the object to determine whether it is a signer file. If not, then control passes to a step 1108 which handles the particular type of drag operation indicated by the user, and thereafter returns to step 1000 (FIG. 10). Like step 1104, the details of step 1108 are unimportant for an understanding of the present invention.

If step 1106 determines that the object which the cursor is over is in fact a signer file, then the system invokes a Digital Signature Manager resource of the operating system in a step 1110, passing the file spec (FSSpec) of the dragged object thereto. Control then returns to step 1000 (FIG. 10) after the Digital Signature Manager exits.

B. Signer Logic Implementation

In a preferred embodiment, the Digital Signature Manager and the Verification Logic divide their functions into the following set of routines. As can be seen, some of the routines either call or are called-back by certain routines provided by and available from RSA Data Security, Inc.

CleanupInitializeSigningContext

Closes the certificate database and frees memory no longer needed.

DisposeContext

Frees memory allocated for the given operation which can be signing or verifying.

FreeCertSet

Frees all the certificates from memory.

GetCertByIssuerSerial

A callback function that searches all certificates in memory for a certificate containing a specific name. An error is returned if no match is found, otherwise, no error. This function is called by RSA functions as appropriate.

GetNthDataBaseItem

Gets the nth item from the certificate database.

GetSignerAndPassword

Puts up a password dialogue so the user can enter their private key password. The user also has the option to change the Signer file they wish to use.

GetSignerAndPasswordBegin

Initializes various values in preparation to display the password dialogue. If the user has a "preferred" Signer file, that one is selected to use by default. Otherwise, the user is prompted for a specific Signer to use.

GetSignerAndPasswordComplete

Completes the password entry process. If the user has entered an incorrect password, a dialogue is displayed and the user is asked to try again. Otherwise, the password dialogue is removed.

InitReadIOContext

Initializes certain structures required to use the RSA functions including the specification of the ReadBlockFunction callback.

InitSigningDatabaseContext

Initializes certain structures required to use the RSA functions including the specification of the SigningInsertCert, SigningSelectBySubject and SigningSelectPrivateKey callbacks.

InitSurrenderContext

Initializes certain structures required to use the RSA functions including the specification of the SurrenderDispatch callback.

InitVerifyingDatabaseContext

Initializes certain structures required to use the RSA functions including the specification of the VerifyingInsertCert, VerifyingSelectByIssuerSerial and VerifyingSelectBySubject callbacks.

InitWriteIOContext

Initializes certain structures required to use the RSA functions including the specification of the WriteBlockFunction callback.

InitializeSigningContext

Calls the appropriate functions needed to prepare to sign. This includes getting a password from the user and making the AddMeBySubject call provided in the RSA code. This function also checks that the the certificate is valid and returns an error if not.

InsertCertificateData

Takes a given certificate and stores it in a local buffer containing all the certificates. We check that a certificate doesn't already exist before adding it to the buffer.

NewContext

Performs initializations required before beginning a sign or verify operation.

PrepDataBase

Opens the certificate database (stored in the Signer file) and initializes some variables required to perform operations on the database.

PrepToAddMeBySubject

Calls functions to open the certificate database, allocate structures and initialize variables.

ProcessData

Calls the RSA routine DigestUpdate to perform digest computation.

ReadBlockFunction

A callback function that reads into a buffer the contents of a specific block of data. This function is called by RSA functions as appropriate.

SearchDataBase

Given a value and length, searches the certificate database (in the Signer file) for a match. If successful, the items index into the file is returned.

Sign

Calls the appropriate functions needed to create a signature and allocates any structures needed to perform the task. Sets the signing time. Makes the PreparePKCSMessage call provided in the RSA code.

SignPrepare

Calls the appropriate functions needed to begin a signing operation including getting the signature size and initializing the context.

SigningSelectBySubject

Retrieves a requested certificate from the certificate database (Signer file).

SigningSelectPrivateKey

Retrieves the DES encrypted private key from the Signer file.

SurrenderDispatch

A callback function that gets called periodically during long processes. This function then calls the client application's callback which gives time to the application for spinning a watch cursor or something similar.

Verify

Calls the appropriate functions needed to verify a signature and deallocates any structures used. Also checks the status of the certificate (expired, pending).

VerifyPrepare

Calls the appropriate functions needed to begin a verification operation including reading in the signature and initializing the context. Also, the signing time is retrieved.

VerifyingInsertCert

Stores the supplied certificates into a buffer.

VerifyingSelectByIssuerSerial

Retrieves a specific certificate from a buffer.

VerifyingSelectBySubject

Searches for a specific certificate from a buffer.

WriteBlockFunction

A callback function that writes into a buffer the contents of a specific block of data. This function is called by RSA functions as appropriate.

Figure 12:
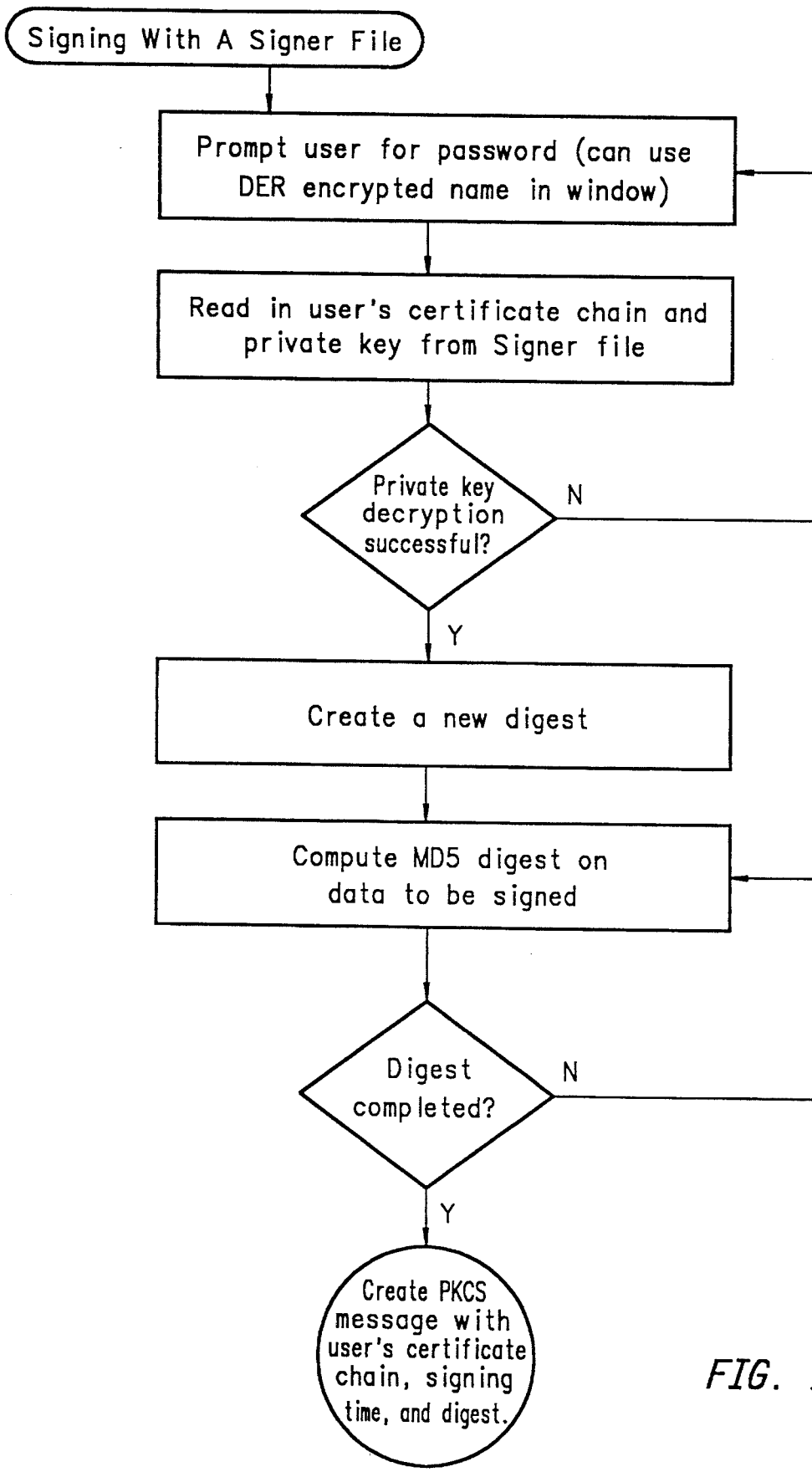
FIG. 12 is a flowchart illustrating a document signing procedure.

FIG. 12 is a self-explanatory flowchart broadly describing the steps performed by the Digital Signature Manager to sign a message. The steps are set forth in more detail below, in the form of a call tree illustrating the sequence in which the routines described above are called. Calls indicated with an asterisk (*) are provided by and available from RSA Data Security, Inc. Calls indicated with a dagger (†) are callback functions described above, and which are specified to subsequent RSA-provided procedures at the point where they appear in the call tree. The SigningSelectBySubject, SigningSelectPrivateKey and SurrenderDispatch procedures are called by the RSA AddMeBySubject procedure, and the ReadBlockFunction, WriteBlockFunction and SurrenderDispatch procedures are called by the RSA PreparePKCSMessage procedure.

```
NewContext
SignPrepare
    InitializeSigningContext
        GetSignerAndPasswordBegin
        PrepToAddMeBySubject
            PrepDataBase
            InitSigningDatabaseContext
                †SigningSelectBySubject
                    SearchDataBase
                    GetNthDataBaseItem
                    *AddListDataAndFlags
                †SigningSelectPrivateKey
            *CreateNameObject
            *CreateMeSet
            *SetNameBER
            InitSurrenderContext
                †SurrenderDispatch
            GetSignerAndPassword
            *AddMeBySubject
            GetSignerAndPasswordComplete
            CleanupInitializeSigningContext
        *GetSignatureSizeFromMeSet
ProcessData
    *DigestUpdate
Sign
    *CreateAttributesObject
    *DigestFinal
    *SetSigningTimeAttribute
    InitReadIOContext
        †ReadBlockFunction
    InitWriteIOContext
        †WriteBlockFunction
    InitSurrenderContext
        †SurrenderDispatch
    *PreparePKCSMessage
    *DestroyDigestObject
    *CreateDigestObject
    *DestroyAttributesObject
DisposeContext
```

VI. VERIFICATION LOGIC

A. Activating the Verification Logic

Like the signer logic, the verification logic 614 (FIG. 6) can be activated from the Digisign utility by clicking on a "verify" menu option. In another embodiment, it might also be activated by selecting (step 1008) the icon corresponding to the file which is to be verified, and then clicking on a "verify" menu option. Unlike the signer logic 612, the verification logic 614 can also be activated by (1) selecting (step 1008) the icon corresponding to the file to be verified; (2) opening the "get info" window from the Macintosh file menu, and clicking on the signature icon 304 (FIG. 3) as previously described. In the flow chart of FIG. 10, clicking on the icon 304 passes control to the Handle Other Clicks step 1004, which first determines that the icon which the cursor is over is in fact the signature icon. If so, the Digital Signature Manager facility of the operating system is invoked and the FSSpec of the then-selected object is passed to it.

B. Verification Logic Implementation

Figure 13:
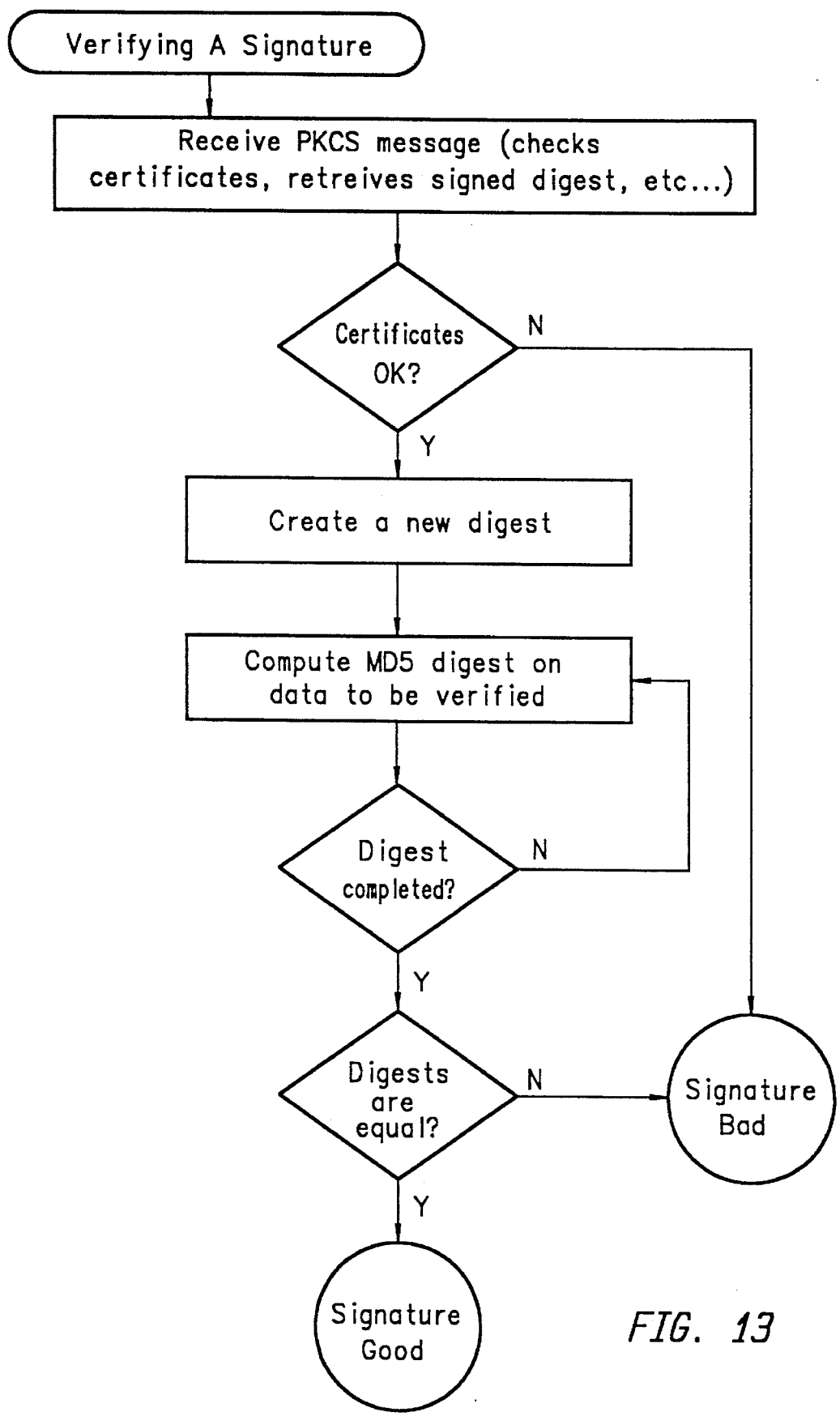
FIG. 13 is a flowchart illustrating a procedure for verifying a signed document.

FIG. 13 is a self-explanatory flowchart broadly describing the steps performed by the Digital Signature Manager to verify a message. The steps are set forth in more detail below, in the same form that the signing steps are set forth above. The VerifyingInsertCert, VerifyingSelectByIssuerSerial, VerifyingSelectBySubject, ReadBlockFunction, WriteBlockFunction and SurrenderDispatch procedures are all called by the RSA ReceivePKCSMessage procedure.

```
NewContext
VerifyPrepare
    InitVerifyingDatabaseContext
        †VerifyingInsertCert
            *GetListDataAndFlags
            InsertCertificateData
        †VerifyingSelectByIssuerSerial
            GetCertByIssuerSerial
            *AddListDataAndFlags
        †VerifyingSelectBySubject
            *AddListDataAndFlags
    *DestroyYouSet
    *CreateYouSet
    *CreateAttributesObject
    InitReadIOContext
        †ReadBlockFunction
    InitWriteIOContext
        †WriteBlockFunction
    InitSurrenderContext
        †SurrenderDispatch
    *ReceivePKCSMessage
    *GetSigningTimeAttribute
    *CreateDigestObject
    FreeCertSet
    *DestroyAttributesObject
ProcessData
    *DigestUpdate
Verify
    *DigestFinal
    *GetYouChainStatus
DisposeContext
```

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for transferring a first message from a source computer system to a destination using a plurality of protection keys and verification keys, each of said protection keys having a corresponding verification key, said source computer system having an operating system and having a display including a graphic workspace with icons displayed thereon, one of said icons representing said first message and another of said icons representing a second file, said second file having a type field indicating that said second file is a signer file, said second file further identifying a first protection key, comprising the steps of:

said source computer system determining, in response to user input indicating selection of said first message icon in conjunction with said second file icon, that the type field of said second file indicates that said second file is a signer file;

said source computer system invoking a signer routine of said operating system in response to said step of determining, and said source computer system identifying said first message and said second file to said signer routine, said signer routine obtaining said first protection key from said second file and creating a protected message from said first message in accordance with said first protection key; and transferring via a transmission medium said protected message to said destination in conjunction with a chain of at least two certificates, said chain including a first certificate and there being a respective prior certificate in said chain for each certificate in said chain except said first certificate, each certificate in said chain including a respective verification key protected in accordance with a respective next one of said protection keys, the verification key in each given certificate in said chain except said first certificate corresponding to the protection key according to which the verification key in the prior certificate to said given certificate is protected, and the verification key in said first certificate corresponding to said first protection key.

2. A method according to claim 1, wherein said first message constitutes a file.

3. A method according to claim 1, wherein said destination comprises a floppy disk.

4. A method according to claim 1, wherein said destination comprises a destination computer system and said transmission medium comprises a floppy disk, and wherein said step of transferring said protected message in conjunction with said chain comprises the steps of:

copying said protected message and said chain from said first computer to said floppy disk; and copying said protected message and said chain from said floppy disk to said second computer.

5. A method according to claim 1, wherein said destination comprises a second computer system.

6. A method according to claim 1, wherein each of said protection keys and its corresponding verification key constitutes a private key and its corresponding public key, respectively.

7. A method according to claim 1, wherein said signer routine step of creating a protected message from said first message comprises the steps of:

forming a digest covering at least a portion of said first message; and encrypting at least a portion of said digest according to said first protection key to form an encrypted digest, said protected message comprising said first message and said encrypted digest.

8. A method according to claim 7, wherein the verification key in each certificate in said chain comprises said verification key and a digest covering at least a portion of said verification key, at least a portion of said digest being encrypted according to the respective next one of said protection keys.

9. A method according to claim 8, wherein said chain further includes a last certificate which is the prior certificate to no certificate in said chain, and wherein said step of transferring said protected message in conjunction with said chain comprises the step of transferring said protected message in conjunction with both said chain and the verification key corresponding to the protection key according to which the verification key in said last certificate is protected.

10. A method according to claim 1, wherein said second file includes said chain of certificates,
   wherein in said step of invoking a signer routine, said signer routine obtains said chain from said second file and prepares a protected file including both said chain and said protected message,
   and wherein said step of transferring said protected message comprises the step of transferring said protected file.

11. A method according to claim 1, for use further with an input device by which a user selects one of said icons for dragging in said workspace and indicates a drop position in said workspace for an icon being dragged, wherein said user input indicating selection of said first message icon in conjunction with said second file icon comprises user input by which a user selects said first message icon for dragging and indicates said second file icon as a drop position for said first message icon.

12. A method according to claim 1, wherein said chain further includes a last certificate which is the prior certificate to no certificate in said chain, there being a respective next certificate in said chain for each certificate in said chain except said last certificate, said method further comprising, after said step of transferring, the verification steps of:
   verifying the verification key in said first certificate according to the verification key in the next certificate to said first certificate;
   verifying the verification key in the next certificate to said first certificate; and
   verifying said protected message in accordance with said verification key in said first certificate.

13. A method according to claim 12, wherein said destination comprises a destination computer system with a display having a graphic workspace with icons displayed thereon, including a 'signed' icon indicating that a corresponding object comprises said protected message, wherein said verification steps are performed by said destination computer system in response to user input indicating selection of said 'signed' icon.

14. A method according to claim 13, wherein said workspace displays said 'signed' icon only in response to user input requesting information about said object.

15. A method according to claim 1, wherein said chain further includes a last certificate which is the prior certificate to no certificate in said chain, there being a respective next certificate in said chain for each certificate in said chain except said last certificate, said method further comprising, after said step of transferring, the steps of:
   verifying the verification key in each certificate in said chain except said last certificate according to the verification key in the respective next certificate in said chain;
   verifying the verification key in said last certificate in said chain; and
   verifying said protected message in accordance with said verification key in said first certificate.

16. A method for transferring a first message from a source to a destination system using a plurality of encryption keys and a plurality of corresponding decryption keys, for use with a display having a graphic workspace with icons displayed thereon, comprising the steps of:
   creating a first digest covering said first message;
   encrypting said first digest according to a first one of said encryption keys to form an encrypted first digest; and
   transferring said first message to said destination in conjunction with both said encrypted first digest and a certificate database, said certificate database including a chain of at least two certificates, said chain including a first certificate and a last certificate, there being a respective prior certificate in said chain for each certificate in said chain except said first certificate, and there being a respective next certificate in said chain for each certificate in said chain except said last certificate, each certificate in said chain including a respective one of said decryption keys and a respective encrypted digest covering said respective decryption key, said respective encrypted digest being encrypted in accordance with a respective next one of said encryption keys, the decryption key in each given certificate in said chain except said first certificate corresponding to the encryption key according to which the encrypted digest in the prior certificate to said given certificate is encrypted, and the decryption key in said first certificate corresponding to said first encryption key, said method further comprising, after said step of transferring and in response to user input indicating selection of a 'signed' icon in said graphic workspace indicating that a corresponding object comprises said protected message, verification steps, performed by said destination system, of:
   creating a verification digest covering said first message;
   decrypting said encrypted first digest according to the decryption key in said first certificate to form a decrypted first digest; and
   comparing said verification digest to said decrypted first digest.

17. A method according to claim 16, further comprising, after said step of transferring and in response to said user input indicating selection of said 'signed' icon, the steps of:
   creating a next verification digest covering the decryption key in said first certificate;
   decrypting the encrypted digest in the next certificate to said first certificate to form a decrypted next digest; and
   comparing said next verification digest to said decrypted next digit.

18. A method according to claim 16, further comprising, after said step of transferring and in response to said user input indicating selection of said 'signed' icon, the steps of:
   creating certificate verification digests, each covering the decryption key in a respective certificate in said chain except said last certificate;
   decrypting the encrypted digest in each certificate in said chain except said last certificate in accordance with the decryption key in each respective next certificate to form a respective decrypted certificate digest for each certificate in said chain except said last certificate; and
   comparing the certificate verification digest for each certificate in said chain except said last certificate with the decrypted certificate digest for the respective certificate.

19. A method according to claim 18, further comprising, after said step of transferring and in response to said user input indicating selection of said 'signed' icon, the steps of:

creating a last certificate verification digest covering the decryption key in said last certificate in said chain;

decrypting the encrypted digest in said last certificate in said chain to form a last decrypted certificate digest; and comparing said last certificate verification digest with said last decrypted certificate digest.

20. A method according to claim 19, wherein each certificate in said chain further includes the decryption key corresponding to the encryption key according to which the encrypted digest in the respective certificate was encrypted.

21. A method for signing a first message, for use with a computer system having an operating system and with a display having a graphic workspace with icons displayed thereon, one of said icons representing said first message and another of said icons representing a second file, said second file having a type field indicating that said second file is a signer file, said second file further identifying a first protection key, comprising the steps of:

said computer system determining, in response to user input indicating selection of said first message icon in conjunction with said second file icon, that the type field of said second file indicates that said second file is a signer file; and said computer system invoking a signer routine of said operating system in response to said step of determining, and said computer system identifying said first message and said second file to said signer routine, said signer routine:

obtaining said first protection key from said second file; and creating a protected message from said first message in accordance with said first protection key.

22. A method according to claim 21, for use with a transmission medium, further comprising the step of transferring to a destination via said transmission medium, said protected message in conjunction with a first certificate including a first verification key for said first protection key, said first verification key being protected in said first certificate in accordance with a second protection key.

23. A method according to claim 22, wherein said step of transferring comprises the step of transferring said protected message to said destination in conjunction with a chain of at least two certificates, said chain including said first certificate and there being a respective prior certificate in said chain for each certificate in said chain except said first certificate, each certificate in said chain including a respective verification key protected in accordance with a respective next one of said protection keys, the verification key in each given certificate in said chain except said first certificate corresponding to the protection key according to which the verification key in the prior certificate to said given certificate is protected, the verification key in said first certificate being said first verification key and the protection key in the next certificate to said first certificate being said second protection key.

24. Apparatus for transferring a first message from a source computer system to a destination using a plurality of protection keys and verification keys, each of said protection keys having a corresponding verification key, said source computer system having an operating system and having a display including a graphic workspace with icons displayed thereon, one of said icons representing said first message and another of said icons representing a second file, said second file having a type field indicating that said second file is a signer file, said second file further identifying a first protection key, comprising:

determining means for determining, in response to user input indicating selection of said first message icon in conjunction with said second file icon, that the type field of said second file indicates that said second file is a signer file;

invoking means for invoking a signer routine of said operating system in response to said step of determining, and identifying said first message and said second file to said signer routine, said signer routine obtaining said first protection key from said second file and creating a protected message from said first message in accordance with said first protection key; and transferring means for transferring via a transmission medium said protected message to said destination in conjunction with a chain of at least two certificates, said chain including a first certificate and there being a respective prior certificate in said chain for each certificate in said chain except said first certificate, each certificate in said chain including a respective verification key protected in accordance with a respective next one of said protection keys, the verification key in each given certificate in said chain except said first certificate corresponding to the protection key according to which the verification key in the prior certificate to said given certificate is protected, and the verification key in said first certificate corresponding to said first protection key.

25. Apparatus for transferring a first message from a source to a destination system using a plurality of encryption keys and a plurality of corresponding decryption keys, for use with a display having a graphic workspace with icons displayed thereon, comprising:

creating means for creating a first digest covering said first message;

encrypting means for encrypting said first digest according to a first one of said encryption keys to form an encrypted first digest; and transferring means for transferring said first message to said destination in conjunction with both said encrypted first digest and a certificate database, said certificate database including a chain of at least two certificates, said chain including a first certificate and a last certificate, there being a respective prior certificate in said chain for each certificate in said chain except said first certificate, and there being a respective next certificate in said chain for each certificate in said chain except said last certificate, each certificate in said chain including a respective one of said decryption keys and a respective encrypted digest covering said respective decryption key, said respective encrypted digest being encrypted in accordance with a respective next one of said encryption keys, the decryption key in each given certificate in said chain except said first certificate corresponding to the encryption key according to which the encrypted digest in the prior certificate to said given certificate is encrypted, and the decryption key in said first certificate corresponding to said first encryption key, said apparatus further comprising means, operable after said step of transferring and in response to user input indicating selection of a 'signed' icon in said graphic workspace indicating that a corresponding object comprises said protected message, verification steps, for:

creating a verification digest covering said first message;

decrypting said encrypted first digest according to the decryption key in said first certificate to form a decrypted first digest; and comparing said verification digest to said decrypted first digest.

26. Apparatus for signing a first message, for use with a computer system having an operating system and with a display having a graphic workspace with icons displayed thereon, one of said icons representing said first message and another of said icons representing a second file, said second file having a type field indicating that said second file is a signer file, said second file further identifying a first protection key, comprising:

determining means for determining, in response to user input indicating selection of said first message icon in conjunction with said second file icon, that the type field of said second file indicates that said second file is a signer file; and invoking means for invoking a signer routine of said operating system in response to said step of determining, and said computer system identifying said first message and said second file to said signer routine, said signer routine having means for:

obtaining said first protection key from said second file; and creating a protected message from said first message in accordance with said first protection key.

* * * * *